United States Patent [19]

Oestreich

[11] 4,076,382
[45] Feb. 28, 1978

[54] OPTICAL CABLE WITH PLASTIC MULTILAYER SHEATH

[75] Inventor: Ulrich Oestreich, Munich, Germany

[73] Assignee: Siemens Aktiengesellschaft, Munich, Germany

[21] Appl. No.: 741,124

[22] Filed: Nov. 11, 1976

[30] Foreign Application Priority Data

Nov. 12, 1975 Germany ................ 2551211

[51] Int. Cl.² ............................................. G02B 5/16
[52] U.S. Cl. ................................................ 350/96.23
[58] Field of Search ............ 350/96 B, 96 WG, 96 BC, 350/96 R; 174/107, 108, 113

[56] References Cited

U.S. PATENT DOCUMENTS 3,883,218   5/1975   Slaughter .................. 350/96 B

FOREIGN PATENT DOCUMENTS 2,265,108   10/1975   France .................. 350/96 B

OTHER PUBLICATIONS

Nakahara et al., "Optical Fibers. . .", Optical Fiber Transmission Conference, Optical Soc. of Amer., Williamsburg, Va., Jan. 1975.

Primary Examiner—Jon W. Henry
Attorney, Agent, or Firm—Kenyon & Kenyon, Reilly, Carr & Chapin

[57] ABSTRACT

In order to protect the transmission elements in an optical cable against mechanical stresses the cable is provided with a plastic sheath which consists of an inner layer of polyurethane and an outer layer of polyvinylchloride with a serving of polyamide filaments arranged between the cable core and the inner layer and also between the inner and outer layers of the sheath.

3 Claims, 1 Drawing Figure

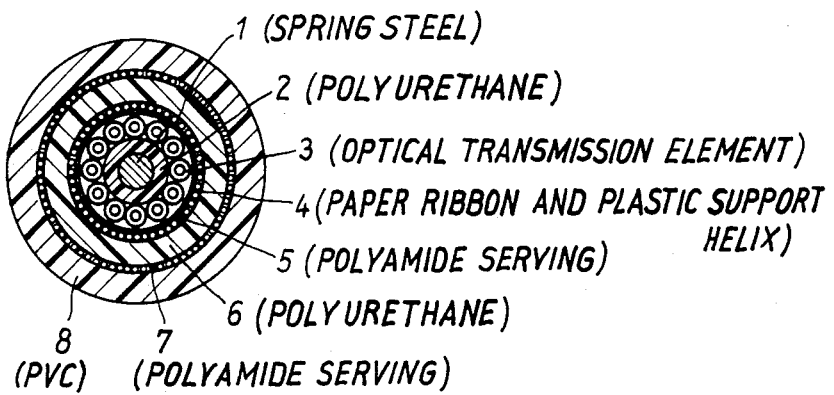

OPTICAL CABLE WITH PLASTIC MULTILAYER SHEATH

BACKGROUND OF THE INVENTION

This invention relates to optical transmission cables in general and more particularly to a cable which includes provisions for improved protection against mechanical stress to the transmission elements in the cables.

In the past few years there has been a great deal of development in the area of optical cables for the transmission of light waves. Such optical cables are being used, for example, for the transmission of control pulses or more generally for transmission of information in the field of communications engineering. Essential components of such cables are glass fibers which are used to guide the light beam carrying the desired information. In designing such optical cables, the mechanical properties of the glass fibers must be taken into consideration. In other words, the glass fibers must be protected, particularly against mechanical stresses such as compression, tensile stresses and being stresses. In one known optical cable, several optical transmission elements in the form of glass fibers are disposed together in at least one stranded layer about an elongated central core which is used to take up tensile stresses. Both under and over the stranded layer, a cushion layer of polyethylene foam is arranged. Over this there is disposed an open covering of copper tape and an outer sheath of plastic such as polyethylene or polyvinylchloride. Such is disclosed, for example, in British Pat. No. 1,425,928.

In another known optical cable, several glass fibers are combined in a bundle and a plurality of bundles twisted together. Between the bundles one or more stress relief wires are disposed and the spaces between the individual glass fibers and between bundles filled with a lubricant. The bundles which are twisted together are surrounded by a first protective sheath on which a metal foil is arranged which in turn is surrounded by a second protective sheath.

The known sheath designs for optical cables are relatively resilient and do not insure sufficient protection of the optical transmissions elements particularly if the optical transmission elements are coupled directly to the cable sheath due to the cable design used. Thus, in some cases, under certain types of mechanical stress, damage to the cables can occur.

In view of this the need for an improved arrangement for protecting optical transmission elements in an optical cable becomes evident.

SUMMARY OF THE INVENTION

The present invention fills such a need. In order to provide a cable which insures adequate mechanical protection, the present invention starts out with an optical cable consisting of a cable core containing the optical transmission elements and a surrounding multilayer sheath of plastic with an outer layer of polyvinylchloride. In accordance with the present invention a layer of thermoplastic polyurethane is arranged under the outer layer of polyvinylchloride and a serving of filaments or rovings of an aromatic polyamide arranged between the layer of thermoplastic polyurethane and the layer of polyvinylchloride as well as between the cable core and the layer of polyurethane.

In an optical cable having a sheath of this nature, the optical transmission elements are effectively protected against external mechanical stresses. The inner serving of polyamide filaments or rovings serves as an armor for the cable core and therefore provides protection against tensile stresses. Along with the inner sheath of thermoplastic polyurethane, which holds the inner armor together, it also serves as a cushion against external compression and impact stresses. On top of the polyurethane layer the outer armor of polyamide filaments or rovings is disposed. This acts particularly to improve protection against tensile stresses. In accordance with the present invention, this layer is preferably applied with a lay opposite to that of the inner armor. The outer polyvinylchloride sheath acts as a rough mechanical shock and abrasion protective mechanism and prevents, because of its stiffness, unintentional small bending radii of the cable.

BRIEF DESCRIPTION OF THE DRAWING

The single FIGURE is a cross-section through a cable constructed according to the present invention.

DETAILED DESCRIPTION OF THE INVENTION

The single FIGURE illustrates an optical cable according to the present invention. The cable has a central element 1 which is of a high tensile strength material such as spring steel wire. The steel wire 1 has a jacket 2 of thermoplastic polyurethane. Stranded over the layer 2 are 10 optical transmission elements 3. These are glass fibers which are loosely arranged in a plastic casing. On top of this layer is a serving 4 of paper ribbon along a support helix of a plastic foil such as polyamide.

The elements through 4, just described, form the cable core. The outer sheath for this core in accordance with the present invention comprises an inner armor layer 5 which is a serving of an aromatic polyamide, an inner sheath 6 of thermoplastic polyurethane, the outer armor layer 7, also a serving of an aromatic polyamide, and finally the outer sheath 8 of polyvinylchloride. The inner and outer armors 5 and 7 consist of a twisted high tensile strength plastic roving of pre-stretched aromatic polyamide such as that which is commercially available under the name "Kevlar". As noted above, they are preferably applied with opposite directions of lay.

What is claimed is:

1. In an optical cable of the type comprising a cable core containing optical transmission elements and a multilayer sheath surrounding the cable core made of plastic with an outer layer of polyvinylchloride, the improvement comprising:
   a. a layer of thermpolastic polyurethane disposed between the outer layer of polyvinylchloride and the cable core;
   b. a first serving of filaments of an aromatic polyamide disposed between said cable core and said polyurethane; and
   c. a second serving of filaments of an aromatic polyamide arranged between said outer layer of polyvinylchloride and said polyurethane.

2. The improvement according to claim 1 wherein said aromatic polyamide is pre-stretched.

3. The improvement according to claim 1 wherein the lay direction of said first and second servings is opposite.

* * * * *